(12) United States Patent
Asahara (10) Patent No.: US 9,753,623 B2
(45) Date of Patent: Sep. 5, 2017

(54) DEVICE HAVING TOUCH PANEL, RADAR APPARATUS, PLOTTER APPARATUS, SHIP NETWORK SYSTEM, VIEWPOINT CHANGING METHOD AND VIEWPOINT CHANGING PROGRAM

(75) Inventor: Tatsuya Asahara, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 491 days.

(21) Appl. No.: 14/349,312

(22) PCT Filed: Oct. 3, 2011

(86) PCT No.: PCT/JP2011/005579
§ 371 (c)(1),
(2), (4) Date: Apr. 2, 2014

(87) PCT Pub. No.: WO2013/051049
PCT Pub. Date: Apr. 11, 2013

(65) Prior Publication Data
US 2014/0245217 A1    Aug. 28, 2014

(51) Int. Cl.
G06F 3/048    (2013.01)
G06F 3/0484    (2013.01)
G06F 3/0488    (2013.01)
G06F 3/0481    (2013.01)

(52) U.S. Cl.
CPC ........ *G06F 3/04845* (2013.01); *G06F 3/0488* (2013.01); *G06F 3/04815* (2013.01)

(58) Field of Classification Search
None
See application file for complete search history.

(56) References Cited

U.S. PATENT DOCUMENTS

| 8,130,271 B2 * | 3/2012 | Imamura ................... B60R 1/00 348/148 |
| 2008/0036743 A1 | 2/2008 | Westerman et al. |
| 2011/0242136 A1 * | 10/2011 | Yamada ............... G01C 21/367 345/660 |

FOREIGN PATENT DOCUMENTS

| JP | 2003114612 A | 4/2003 |
| JP | 2006162480 A | 6/2006 |
| JP | 2007328570 A | 12/2007 |

OTHER PUBLICATIONS

ISA Japanese Patent Office, International Search Report of PCT/JP2011/005579, Dec. 13, 2011, WIPO, 1 page.

* cited by examiner

*Primary Examiner* — Jeffrey A Gaffin
*Assistant Examiner* — Ayesha Huertas Torres
(74) *Attorney, Agent, or Firm* — Alleman Hall Creasman & Tuttle LLP (57) ABSTRACT

A touch panel device displays a nautical chart as map data on a display screen. The touch panel device detects a first touch operation on the display screen and a second touch operation on the display screen, the first touch operation being a touch operation of which a position is fixed, the second touch operation being a touch operation of which a position is changed. The touch panel device obtains a rotational axis parallel to the sea surface based on the position of the first touch operation, and rotates a viewpoint of the map data centering on the rotational axis based on a change amount of a distance from the position of the first touch operation to the position of the second touch operation.

14 Claims, 8 Drawing Sheets

DEVICE HAVING TOUCH PANEL, RADAR APPARATUS, PLOTTER APPARATUS, SHIP NETWORK SYSTEM, VIEWPOINT CHANGING METHOD AND VIEWPOINT CHANGING PROGRAM

TECHNICAL FIELD

The present invention mainly relates to a device having a touch panel, which displays map data.

BACKGROUND ART

Conventionally, devices having touch panels (hereinafter, may simply be referred to as the touch panel device) which can recognize touch operations at two or more positions have been known. Patent Document 1 discloses a method of performing predetermined processing on such kind of touch panel device, a touch pad and the like according to touch operation contents (touching gestures), and discloses specific examples of the predetermined processing.

In Patent Document 1, an example where a rotate command is executed when a first touch operation and a second touch operation are recognized and it is detected that the position of the second touch operation rotates around the position of the first touch operation while the position of the first touch operation remains unchanged (see the paragraph 0142 and FIG. 17).

In Patent Document 1, although the detailed contents of the rotational command are not described, it can be considered as a command for detecting whether the second touch operation is clockwise or counterclockwise and rotating a photograph, a graphic or the like in the detected direction. When displaying a photograph, a graphic and the like two-dimensionally, they can be rotated as an operator intends to, with such a simple touch gesture.

REFERENCE DOCUMENTS OF CONVENTIONAL ART

Patent Document(s)

Patent Document 1: US2008/0036743A1

DISCLOSURE OF THE INVENTION

Problems to be Solved by the Invention

However, for example, when displaying map data or the like three-dimensionally, since the rotational axis is not fixed uniquely, it is difficult to, with only the touch gesture described above, rotate (change the viewpoint of) the map data or the like as the operator intends to. When changing the viewpoint of the map data, for example, the operator needs to specify the rotational axis and specify how much angle of viewpoint to rotate around the rotational axis. The user can change the viewpoint of the map data to a desired viewpoint by repeating the series of operations described above as needed.

With this method, although the viewpoint can be changed as the operator intends to, complicated operations are required. Moreover, such complicated operations are not suitable for a general touch panel device on which instinctive operation is desired, and there has been a room for improvement.

The present invention is made in view of the above situations and aims to provide a touch panel device which is able to change a viewpoint of map data with instinctive operation.

Summary and Effect(s) of the Invention

Problems to be solved by the present invention are described above, and means for solving the problems and effects thereof will be described below.

According to a first aspect of the present invention, a device having a touch panel with the following configuration is provided. That is, the device having the touch panel includes a display unit, a detector, and a controller. The display unit displays map data on a display screen. The detector detects a first touch operation on the display screen and a second touch operation on the display screen, the first touch operation being a touch operation of which a position is fixed, the second touch operation being a touch operation of which a position is changed. The controller obtains a rotational axis parallel to the sea surface based on the position of the first touch operation, and rotates a viewpoint of the map data centering on the rotational axis based on a change amount of a distance from the position of the first touch operation to the position of the second touch operation.

Thus, an operator can change the viewpoint of the map data in its height direction with instinctive and simple operation.

With the above device having the touch panel, the controller is preferred to obtain a rotational axis perpendicular to the sea surface based on the position of the first touch operation, and rotate the viewpoint centering on the rotational axis based on a rotate amount of the second touch operation with respect to the position of the first touch operation.

Thus, the operator can change the viewpoint of the map data in its azimuth direction with instinctive and simple operation.

With the above device having the touch panel, the controller is preferred to be able to recognize the change amount of the distance and the rotate amount individually, and perform simultaneously the processing of rotating the viewpoint centering on the rotational axis parallel to the sea surface, and the processing of rotating the viewpoint centering on the rotational axis perpendicular to the sea surface.

Thus, the rotations of the viewpoint with different reference axes can be performed simultaneously. Therefore, compared to the configuration in which the rotation of the viewpoint is performed with one reference axis at a time, the viewpoint can be changed promptly.

With the above device having the touch panel, among a plurality of touch operations, the touch operation detected first by the detector is preferred to be the first touch operation.

Thus, when changing the viewpoint after determining a reference position, the operator can perform the operation of changing the viewpoint instinctively.

With the above device having the touch panel, it is preferred to have the following configuration. That is, a viewpoint changing mode in which the viewpoint is changed is provided. The controller changes the viewpoint only in the viewpoint changing mode.

Thus, the touch operation of changing the viewpoint can be associated to other processing (e.g., a change of the scale).

With the above device having the touch panel, it is preferred to have the following configuration. That is, when the position of the viewpoint approaches to the sea surface more than a predetermined amount, a display mode is shifted to an underwater display mode in which a situation under the sea is displayed.

Thus, since the display mode is shifted to the underwater display mode when the height of the viewpoint becomes lower and close to the sea surface, an instinctive operation can be achieved.

With the above device having the touch panel, the map data is preferred to be two-dimensional map data.

Thus, the operator can change the viewpoint of the two-dimensional map data with an instinctive and simple operation.

With the above device having the touch panel, the map data is preferred to be three-dimensional map data.

Thus, the operator can change the viewpoint of the three-dimensional map data with instinctive and simple operation.

With the above device having the touch panel, it is preferred to have the following configuration. That is, the device is to be installed in a ship. The device includes a memory configured to store nautical chart information as the map data. The controller displays a position of the ship on the nautical chart based on positional information received from a GNSS sensor.

Thus, since the viewpoint of the nautical chart can be changed while referring to the position of the ship, information around the ship can accurately be acquired.

According to other aspects of the present invention, a radar apparatus, a plotter apparatus, and a ship network system each including the device having the touch panel, are provided.

Thus, the effects of the present invention can be exerted with radar apparatuses, plotter apparatuses, and ship network systems.

According to a second aspect of the present invention, the following viewpoint changing method is provided. That is, the viewpoint changing method includes: displaying map data on a display screen; detecting a first touch operation on the display screen and a second touch operation on the display screen, the first touch operation being a touch operation of which a position is fixed, the second touch operation being a touch operation of which a position is changed; and obtaining a rotational axis parallel to the sea surface based on the position of the first touch operation, and rotating a viewpoint of the map data centering on the rotational axis based on a change amount of a distance from the position of the first touch operation to the position of the second touch operation.

Thus, an operator can change the viewpoint of the map data in its height direction with instinctive and simple operation.

According to a third aspect of the present invention, a viewpoint changing program having the following configuration is provided. That is, the viewpoint changing program causes a computer to: display map data on a display screen; detect a first touch operation on the display screen and a second touch operation on the display screen, the first touch operation being a touch operation of which a position is fixed, the second touch operation being a touch operation of which a position is changed; and obtain a rotational axis parallel to the sea surface based on the position of the first touch operation, and rotate a viewpoint of the map data centering on the rotational axis based on a change amount of a distance from the position of the first touch operation to the position of the second touch operation.

Thus, an operator can change the viewpoint of the map data in its height direction with instinctive and simple operation.

According to a fourth aspect of the present invention, a device having a touch panel with the following configuration is provided. That is, the device having the touch panel includes a display unit, a detector, and a controller. The display unit displays map data on a display screen. The detector detects a first touch operation and a second touch operation on the display screen. The controller obtains a first rotational axis and a second rotational axis based on a position of the first touch operation, rotates a viewpoint of the map data centering on the first rotational axis based on a rotate amount of the second touch operation with respect to the position of the first touch operation, and rotates the viewpoint centering on the second rotational axis based on a change amount of a distance from the position of the first touch operation to the position of the second touch operation.

An operator can change the viewpoint of the map data with instinctive and simple operation.

MODE(S) FOR CARRYING OUT THE INVENTION

Figure 1:
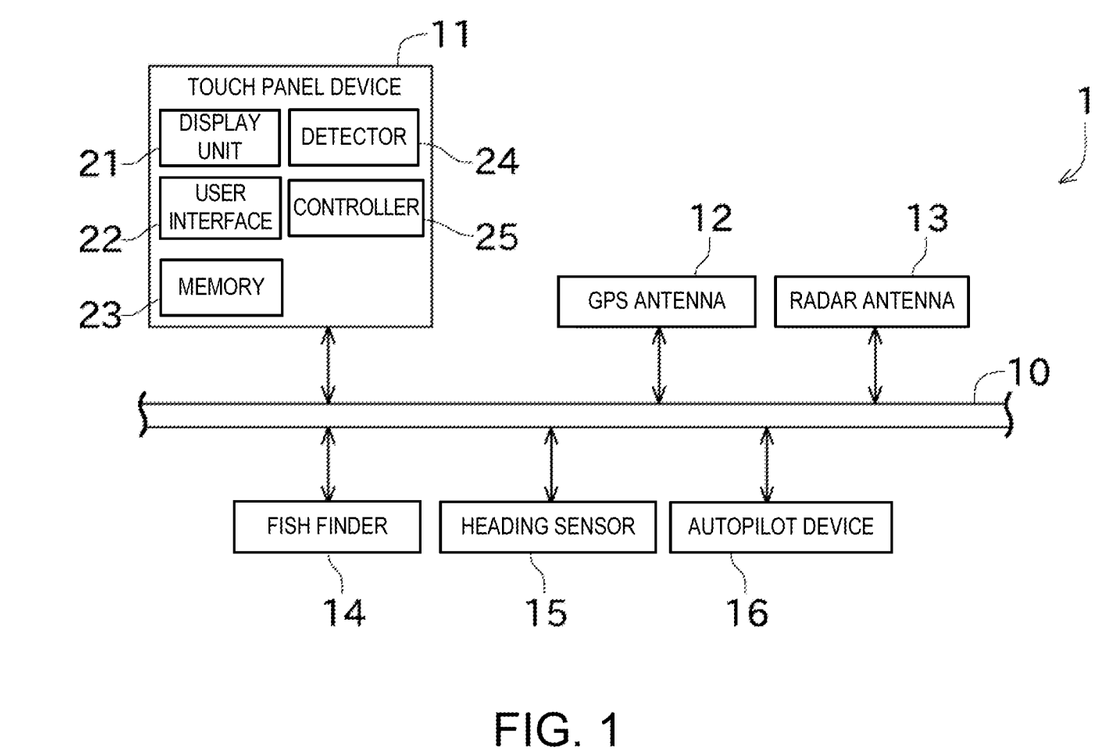
FIG. 1 is a block diagram illustrating an overall configuration of a ship instrument network system.
Figure 2:
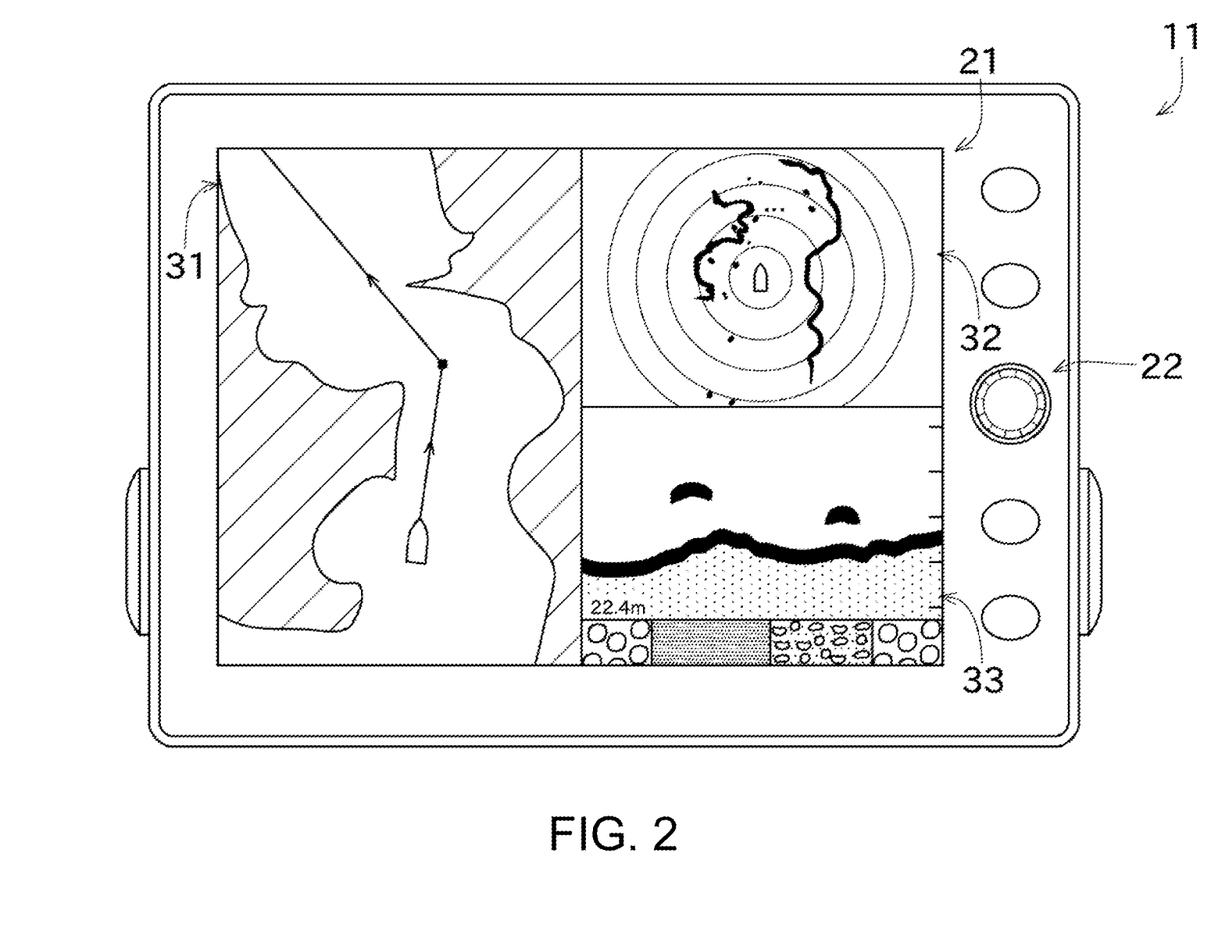
FIG. 2 is a front view of a touch panel device.

Next, one embodiment of the present invention is described with reference to the drawings. FIG. 1 is a block diagram illustrating an overall configuration of a ship instrument network system 1. FIG. 2 is a front view of a touch panel device 11.

The ship instrument network system 1 of this embodiment includes a plurality of ship instruments connected to a ship network 10. The ship instruments can exchange, for example, detected information via the ship network 10 with each other. As the standard of the ship network 10, LAN (Local Area Network) or CAN (Controller Area Network) can be adopted, for example.

As illustrated in FIG. 1, the ship instrument network system 1 of this embodiment includes a device having a touch panel (hereinafter, simply be referred to as the touch panel device) 11, a GPS antenna (GNSS sensor) 12, a radar antenna 13, a fish finder (acoustic sensor) 14, a heading sensor 15, and an autopilot device 16.

The touch panel device 11 is configured to create and display an image (sensor image) based on information detected by the other ship instruments (sensors), detect a touch operation on a display screen, and perform processing according to the detection result. Specifically, the touch panel device 11 includes a display unit 21, a user interface 22, a memory 23, a detector 24, and a controller 25.

The display unit 21 is comprised of, for example, a liquid crystal display, and can display the sensor image, various setting screens and the like on the display screen as described above.

The user interface 22 is comprised of, for example, a rotary key to which a clockwise or counterclockwise rotational operation can be performed, and a hardware key, such as a menu key or the like for calling out a menu screen. Note that, with the touch panel device 11, input and instruction can be performed by a touch operation on the display screen. Therefore, the number of keys of the user interface 22 can be reduced.

The memory 23 stores, for example, contents of program(s) to be executed by the controller 25, nautical chart information, and navigation route(s) set by an operator.

The detector 24 detects the touch operation performed on the display screen by the operator. In this embodiment, a projected capacitance system is used as a system for detecting the touch operation. This system is configured such that a plurality of electrodes with high transparency are disposed on a display panel and a touched position is detected based on a change of an electric capacity of each electrode caused when a fingertip approaches the panel. With this configuration, not only the touched position but also a finger motion in a touching state (change of the touched position) can be detected. Moreover, when two or more positions are touched simultaneously, the detector 24 can also detect the respective touched positions and changes of the respective touched positions. The touched position(s) and the changes of the touched position(s) detected by the detector 24 are outputted to the controller 25. Note that, the system for detecting the touch operation is not limited to the projected capacitance system, and any other suitable system may be adopted. Moreover, other than the touch operation by a finger, a configuration in which a touch operation by a tapered stick-like member is detected may be adopted, for example.

The controller 25 creates the sensor image (a radar image, a nautical chart around the ship, etc.) based on stored contents in the memory 23 and information received from other ship instrument(s), and displays it on the display unit 21. The controller 25 receives information from a plurality of ship instruments and creates a plurality of sensor images. The controller 25 can switch a screen mode between a mode for displaying only one of the plurality of sensor images on the display screen (full screen mode) and a mode for dividing the display screen and displaying a plurality of sensor images thereon (divided screen mode, see FIG. 2).

Moreover, the controller 25 performs matching between the change of the touched position detected by the detector 24 and predetermined touch operation contents (touch gestures), and thereby, identifies which touch gesture is performed by the operator. Then, the controller 25 performs processing corresponding to the identified touch gesture.

One specific example of the touch gestures includes a "drag operation." The drag operation is a touch gesture of moving a touching finger (normally one finger) on the display screen to a predetermined direction without separating it from the display screen. Scrolling of the image is normally associated with this drag operation. Note that, the drag operation also includes an operation of quickly moving the finger while touching the display screen (flick operation), and the like. Moreover, another example of the touch gestures includes a "pinch operation." The pinch operation is an operation of, without separating two touching fingers from the display screen, bringing the fingers close to each other (pinch in) or separating them from each other (pinch out). Processing of changing a scale of the image (processing of zooming in and zooming out) is normally associated with this pinch operation. Note that, the controller 25 can also identify other various touch gestures than the examples given above.

The GPS antenna 12 receives positioning signals from GPS satellites (GNSS satellites) and outputs them to, for example, the touch panel device 11 via the ship network 10. The controller 25 of the touch panel device 11 obtains a location of the ship (specifically, a location of the GPS antenna and a terrestrial reference absolute position) based on the positioning signals. Note that, a configuration in which the calculation for obtaining the location based on the positioning signals is performed on the GPS antenna 12 side and the ship location is outputted to the touch panel device 11 may be adopted.

The touch panel device 11 can exert a function as a navigation device based on the obtained ship location and the nautical chart information stored in the memory 23. Specifically, based on the acquired ship location and the nautical chart information stored in the memory 23, the controller 25 can superimpose the ship location on the nautical chart and display it on the display unit 21. Moreover, the controller 25 can obtain a ground speed and a trace of the ship by utilizing the ship location which changes with time, and display them on the display unit 21. Further, the controller 25 can create a navigation route and display it on the display unit 21 based on the operator's selecting of a destination and a waypoint (stopover point) with the touch operation (see a first sensor image 31 illustrated in FIG. 2).

The radar antenna 13 transmits a microwave and receives a reflection wave from an object. The reflection wave is suitably signal-processed and then outputted to the touch panel device 11. The touch panel device 11 creates a radar image based on the reflection wave. Specifically, the controller 25 of the touch panel device 11 obtains a distance of the object based on a time length from the transmission of the microwave to the reception of the reflection wave. Moreover, the controller 25 obtains a direction in which the object exists, based on a direction to which the microwave is transmitted. The controller 25 creates the radar image as described above and displays it on the display unit 21 (see a second sensor image 32 illustrated in FIG. 2).

The fish finder 14 is comprised of a transducer and an analyzer. The transducer is installed in, for example, the bottom of the ship, and discharges an ultrasonic wave directly below into the sea and receives the reflection wave from the sea bottom or a school of fish. The analyzer creates fish finding data (data acquired by the fish finder and data of the school of fish or the sea bottom) based on the reflection wave. Moreover, the fish finder 14 of this embodiment has a function to determine a state of the sea bottom (bottom sediment type) based on the acquired fish finding data. Specifically, the analyzer can determine which kind the sea bottom falls in with higher possibility, among rocks, gravel (stones), sand, and mud, by analyzing the received reflection wave. The fish finding data and the determined bottom sediment type are outputted to the touch panel device 11. Then, the controller 25 of the touch panel device 11 creates a third sensor image 33 based on the received data (see FIG. 2) and displays it on the display unit 21. In the third sensor image 33, the vertical axis indicates the fish finding data and the horizontal axis indicates a timing at which the fish finding data is acquired (the data is older as it goes toward the left end of the display screen).

The heading sensor 15 is configured to detect a heading of the ship (a direction to which a bow of the ship is heading) by a terrestrial reference absolute position. Generally, a ship travels forward, toward its bow direction. Therefore, it can be said that the heading sensor 15 detects an azimuth of the forward direction of the hull of the ship. For example, a magnetic azimuth sensor or a GPS compass may be used as the heading sensor 15.

The autopilot device 16 is a device for automatically controlling a rudder so that the ship travels along the set navigation route. Specifically, the autopilot device 16 obtains how much the bow of the ship is to be changed based on the heading acquired from the heading sensor 15 and the navigation route acquired from the touch panel device 11. Then, the autopilot device 16 matches the course of the ship with the navigation route by changing an angle of the rudder according to the obtained value.

The ship instrument network system 1 of this embodiment is configured as described above. Note that, the ship instruments constituting the ship instrument network system 1 are arbitrary, and a configuration in which ship instrument(s) other than those described above are connected, or a configuration in which a plurality of similar types of ship instruments are connected may be adopted. Moreover, a configuration in which the processing of the data acquired by the ship instruments is performed by the ship instrument concerned may be adopted, or a configuration in which the processing of the data acquired by the ship instruments is performed by the controller 25 of the touch panel device 11 may be adopted.

Next, the nautical chart displayed by the touch panel device 11 is described in detail. The memory 23 of the touch panel device 11 stores nautical chart information which can be displayed three-dimensionally. The controller 25 can display the nautical chart and the ship (a ship mark 40 illustrated in FIG. 5) three-dimensionally based on the nautical chart information. Moreover, the controller 25 can perform processing of changing a viewpoint of the three-dimensional nautical chart (processing of rotating the nautical chart). Note that, the "map data" in the present specification includes, not only charts where shapes of the ground surface and the like are plotted, but also aeronautical charts where information for aircrafts to travel is plotted, nautical charts where information for ships to travel is plotted, etc.

Figure 3:
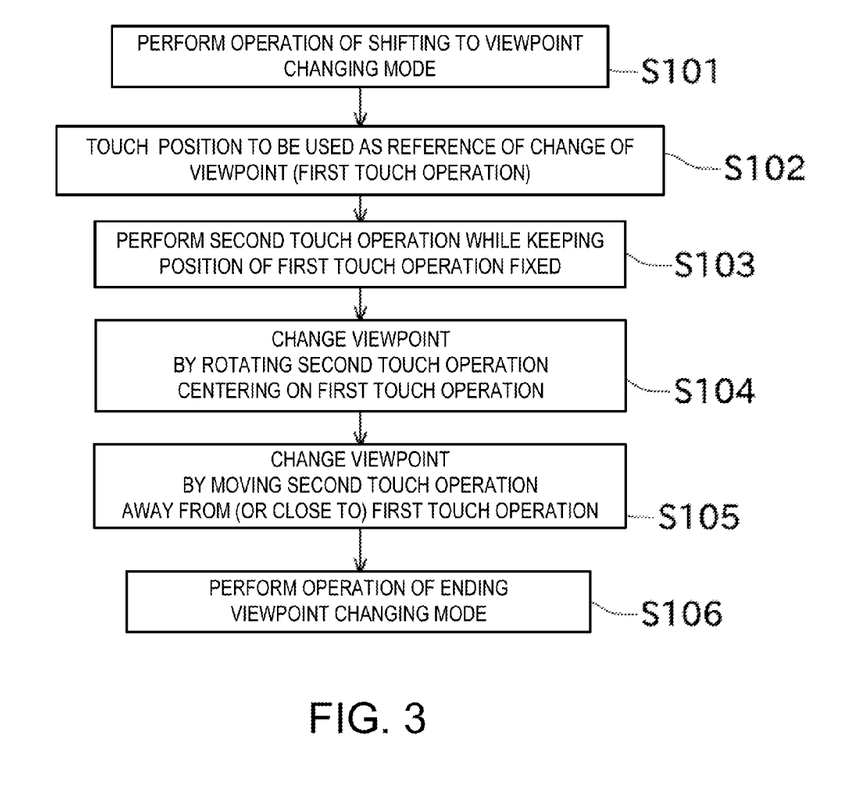
FIG. 3 is a flowchart illustrating operation performed by an operator when changing a viewpoint of map data.
Figure 4A:
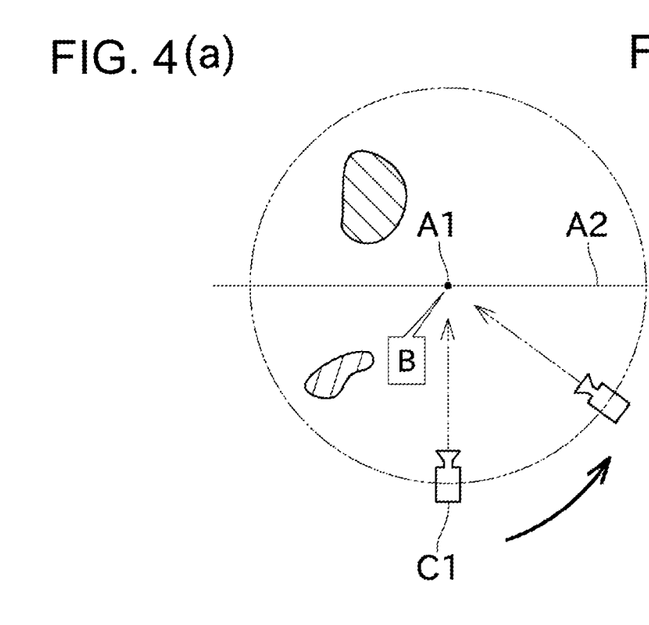
FIGS. 4(a) and 4(b) show views for describing a rotational axis when changing the viewpoint.
Figure 4B:
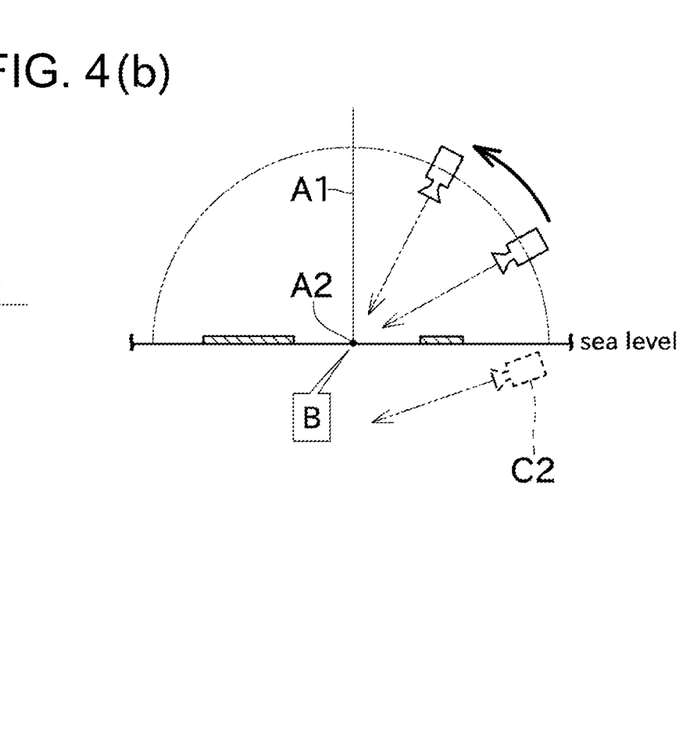
Figure 5:
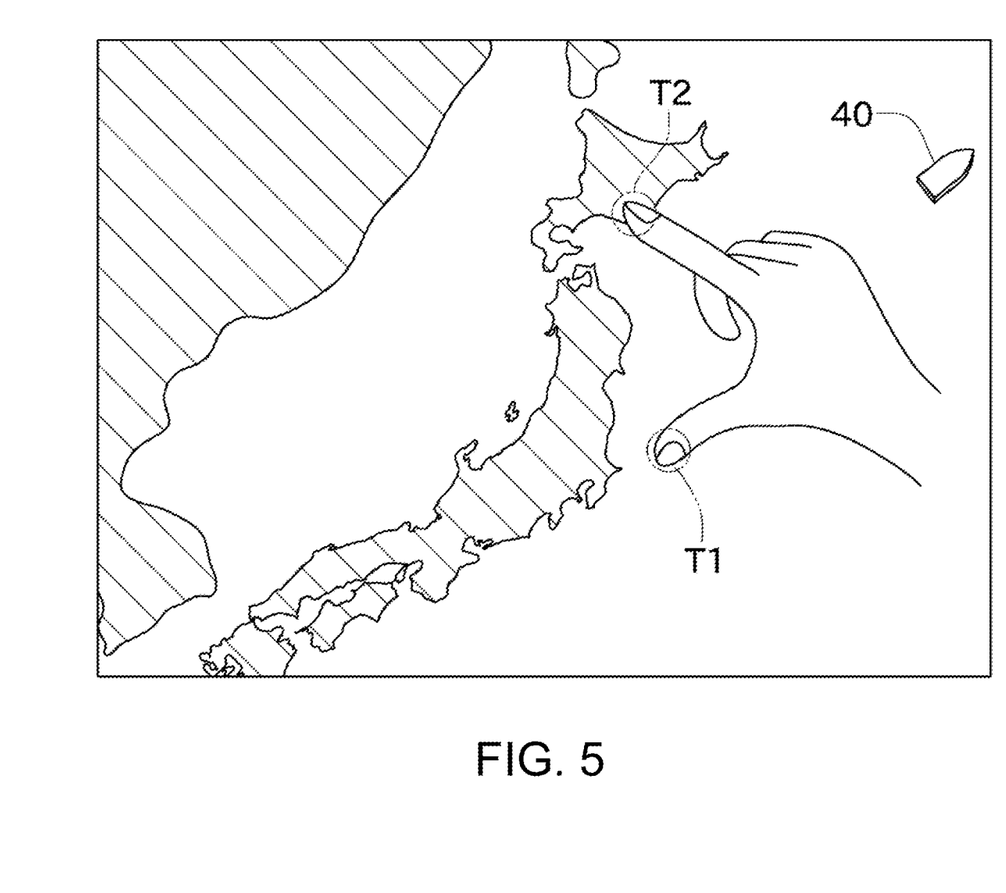
FIG. 5 is a view illustrating a display screen before changing the viewpoint.
Figure 6:
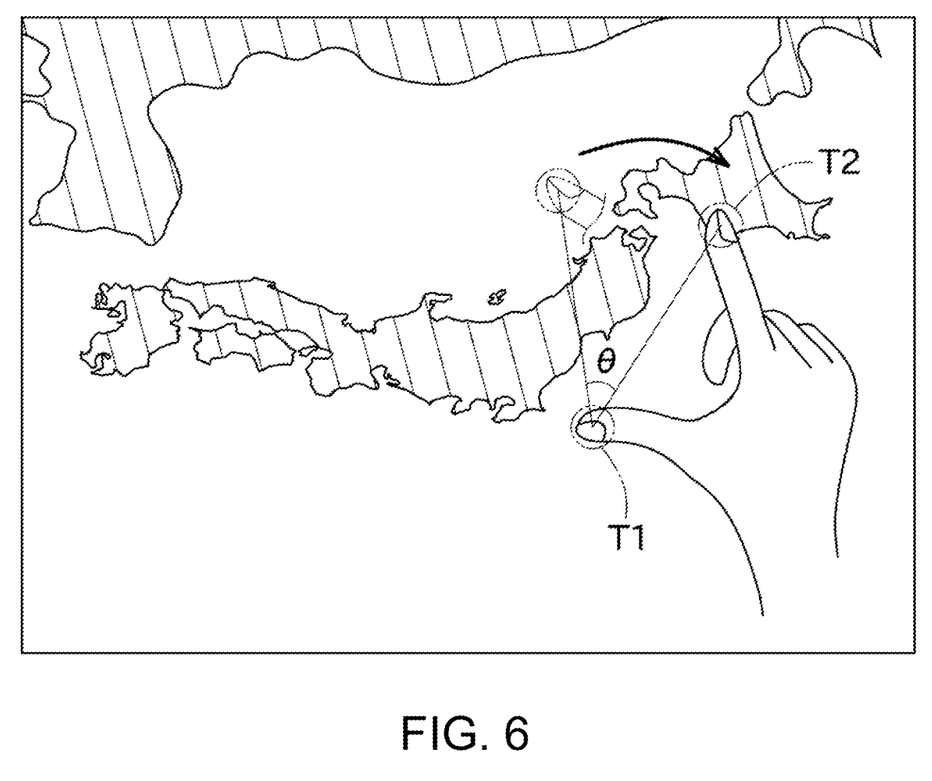
FIG. 6 is a view illustrating the display screen after changing the viewpoint around a first rotational axis.
Figure 7:
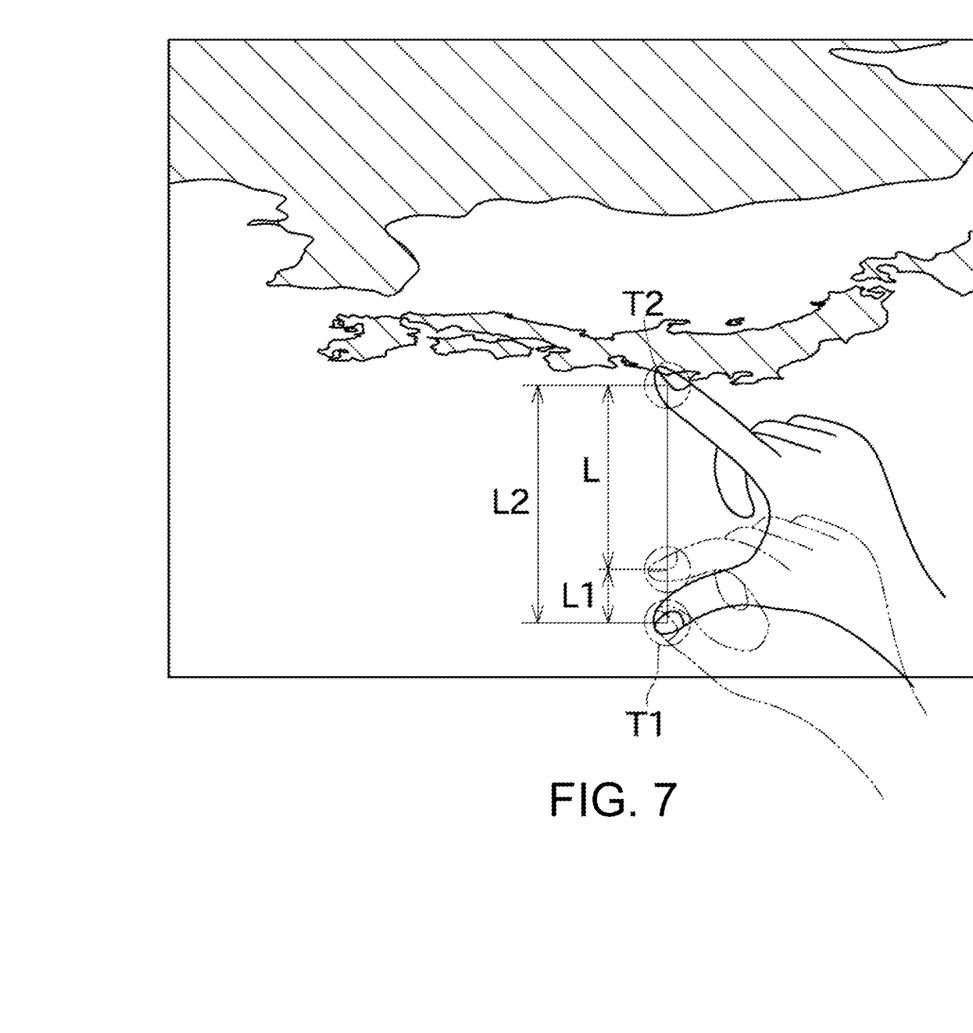
FIG. 7 is a view illustrating the display screen after changing the viewpoint around a second rotational axis.

Hereinafter, operation performed by the operator when changing the viewpoint of the nautical chart and processing performed by the controller 25 are described with reference to FIGS. 3 to 7. FIG. 3 is a flowchart illustrating the operation performed by the operator when changing the viewpoint of the map data. FIGS. 4(*a*) and 4(*b*) show views for describing a rotational axis when changing the viewpoint. FIGS. 5 to 7 show views illustrating the nautical chart of which the viewpoint is to be changed.

When changing the viewpoint of the nautical chart, the operator shifts the touch panel device 11 to a viewpoint changing mode with the operation of the user interface 22 or the touch operation (S101). Next, the operator touches a position to be used as a reference of the change of the viewpoint (a first touch operation T1, S102). That is, in this embodiment, the first touch operation T1 which is the touch operation performed first is used as the reference of the viewpoint change. As illustrated in FIG. 5, this first touch operation T1 is normally performed by a thumb. Note that, by separating the finger from the display screen and touching the display screen again, the first touched position can be adjusted.

Based on the first touched position, the controller 25 obtains a first rotational axis and a second rotational axis serving as rotational centers when rotating the viewpoint. Hereinafter, a method of obtaining the rotational axes is described with reference to FIGS. 4(*a*) and 4(*b*). FIG. 4(*a*) is the view of the nautical chart seen from a direction perpendicular to the sea surface, and FIG. 4(*b*) is the view of the nautical chart seen from a direction parallel to the sea surface. Moreover, in FIGS. 4(*a*) and 4(*b*), the position of the camera indicates the position of the viewpoint, and the arrow drawn from the camera indicates the direction of the line of sight. First, the controller 25 obtains a spot (reference position B) where an altitude above sea is 0 m on the nautical chart, which corresponds to the first touched position on the display screen. Next, the controller 25 obtains a line drawn through the reference position B in the direction perpendicular to the sea surface and sets the line to be the first rotational axis A1. Next, the controller 25 obtains a line drawn through the reference position B in the direction parallel to the sea surface and sets the line to be the second rotational axis A2. Note that, although a countless number of lines parallel to the sea surface exist, the controller 25 determines the second rotational axis A2 such that it is perpendicular to the line of sight. In other words, in a case where the viewpoint is at the position of the viewpoint C1 in FIG. 4(*a*), the second rotational axis A2 is determined to be perpendicular to the line of sight extending from the viewpoint C1. Note that, in a case of rotating the viewpoint centering on the first rotational axis A1, the position of the viewpoint is changed along the chain-line circle illustrated in FIG. 4(*a*). Whereas, in a case of rotating the viewpoint centering on the second rotational axis A2, the position of the viewpoint is changed along the chain-line circle illustrated in FIG. 4(*b*).

Next, the operator, while keeping the state where the finger touches the display screen in the first touch operation T1, touches a different position with a different finger as illustrated in FIG. 5 (a second touch operation T2, S103). Then, the operator, while keeping the state where both of the two fingers touch the display screen, rotationally moves the position of the finger touching in the second touch operation T2, as if drawing an arc centering on the first touch operation T1. Thus, the viewpoint can be rotated so that the nautical chart rotates following the second touch operation T2 (the nautical chart rotates centering on the first rotational axis A1) (S104, FIG. 6).

The viewpoint change processing at S104 is performed as follows. That is, the detector 24 detects a change of the touched position and outputs it to the controller 25. The controller 25 obtains a rotate amount θ in the second touch operation T2 with respect to the position of the first touch operation T1 based on the data acquired from the detector 24. Then, the controller 25 rotates the viewpoint centering on the first rotational axis A1 by the obtained rotate amount θ or an amount based on the rotate amount θ.

Next, the operator, while keeping the state where the finger of the first touch operation T1 side touches the display screen, separates the finger touching in the second touch operation T2, from the display screen once and then touches near the position of the first touch operation T1 (see the chain line in FIG. 7). Then, the operator, while keeping the state where both of the two fingers touch the display screen, moves the position of the finger touching in the second touch operation T2 away from the position of the first touch operation T1. Thus, the viewpoint can be rotated such that the nautical chart rotates centering on the second rotational axis A2 (S105, FIG. 7).

The viewpoint change processing at S105 is performed as follows. That is, the controller 25 obtains distances from the position of the first touch operation T1 to the position of the second touch operation T2 based on the data acquired from the detector 24, and obtains how much the distance has changed before and after the operation by the operator (change amount L). As illustrated in FIG. 7, first, the positions of both of the touch operations are apart from each other by a distance L1. Then after the operation by the operator, the positions of the two touch operations are apart from each other by a distance L2. Therefore, the controller 25 obtains the change amount L by subtracting the distance L1 from the distance L2. The controller 25 rotates the viewpoint centering on the second rotational axis A2 by the amount based on the change amount L obtained as above.

Further, when rotating the viewpoint again, the operator repeats the operation at S104 or S105. Then, when the viewpoint is changed to a desired viewpoint, the operator performs operation of ending the viewpoint adjustment mode (S106).

Note that, during the rotation of the viewpoint performed at S105, when the viewpoint is rotated and approaches the sea surface by more than a predetermined amount, the controller 25 switches the mode to a mode (underwater display mode) in which a situation under the sea when looking at the nautical chart from underwater is displayed (see the viewpoint C2 in FIG. 4(b)) instead of the normal mode in which the nautical chart is looked with a bird-eye view. In this underwater display mode, the water depth can be visually grasped based on the nautical chart information in the memory 23. Note that, the determination of the condition "the viewpoint approaches the sea surface more than the predetermined amount" can be performed based on, for example, an angle between the sea surface and the line of sight or a distance from the sea surface to the viewpoint.

Figure 8:
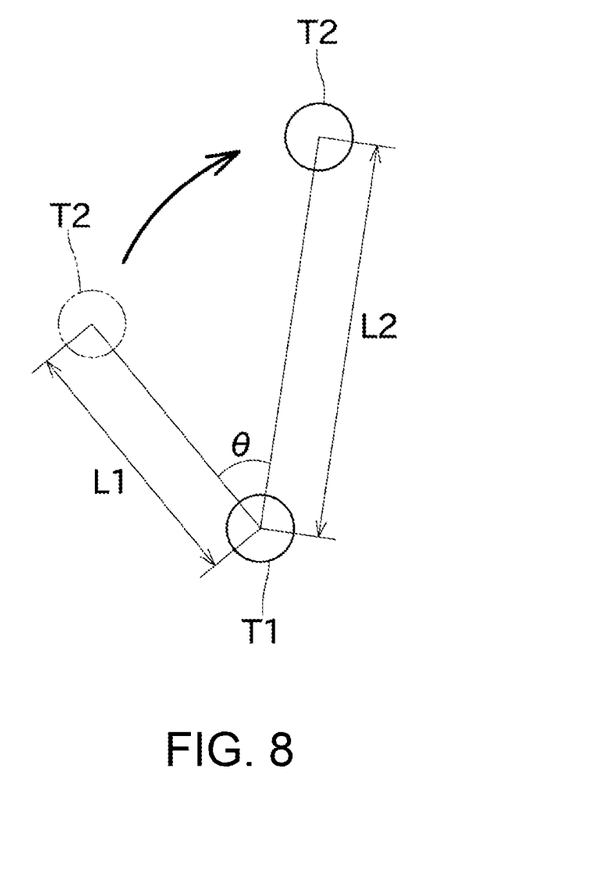
FIG. 8 is a view illustrating an example of simultaneously changing a rotate amount and a change amount in distance by moving a position of a second touch operation.

Moreover, the touch panel device 11 of this embodiment is configured to be able to perform the processing at S104 and the processing at S105 simultaneously. That is, for example as illustrated in FIG. 8, in a case where the finger touching in the second touch operation T2 compositely changes its position so as to change the angle centering on the position of the first touch operation T1 and move away from or closer to the position of the first touch operation T1, even with such a movement of the finger, the controller 25 can obtain the rotate amount θ and the change amount L according to the positional change of the second touch operation T2. Further, the controller 25 can rotate the viewpoint around the first rotational axis A1 by an amount based on the rotate amount θ and, simultaneously, rotate the viewpoint around the second rotational axis A2 by an amount based on the change amount L. As a result, further instinctive viewpoint changing operation is achieved.

As described above, the touch panel device 11 of this embodiment includes the display unit 21, the detector 24, and the controller 25. The display unit 21 displays the nautical chart as the map data on the display screen. The detector 24 detects the first touch operation T1 on the display screen, and the second touch operation T2 on the display screen, the first touch operation being the touch operation in which the touched position is not changed, the second touch operation being the touch operation in which the touched position is changed. The controller 25 obtains the first rotational axis A1 and the second rotational axis A2 based on the position of the first touch operation T1, and rotates the viewpoint centering on the first rotational axis A1 based on the rotate amount θ of the second touch operation T2 with respect to the position of the first touch operation T1, and rotates the viewpoint centering on the second rotational axis A2 based on the change amount L in distance from the position of the first touch operation T1 to the position of the second touch operation T2.

Thus, the operator can change the viewpoint with instinctive and simple operation and display the nautical chart three-dimensionally.

Although the preferred embodiment of the present invention is described above, the above configuration may be modified as follows, for example.

In the above embodiment, the embodiment in which the GPS is used as one example of the GNSS is described; however, needless to say that the configuration may be such that other kind of GNSS is used.

The method of determining the first rotational axis A1 and the second rotational axis A2 based on the first touched position is arbitrary, and is not limited to the method described above.

In the above embodiment, the touch panel device has the configuration in which the rotations of the viewpoint centering on the first rotational axis A1 and the second rotational axis A2 respectively can be performed simultaneously; however, for example, the configuration may be such that a mode in which only one of the rotations described above can be performed is provided, and the rotations are performed one by one. Alternatively, the touch panel device may have a configuration in which only the rotation of the viewpoint centering on the second rotational axis A2 is performed.

The touch panel device 11 of this embodiments is a general display device which receives information from a plurality of sensors and displays it; however, the present invention may also be applied to a display device which displays mainly one kind of information (e.g., nautical chart information). Moreover, the present invention may also be applied to, for example, a plotter apparatus which can display nautical chart information, a radar apparatus which can display nautical chart information and a radar image.

For example, in a case where the processing of changing the scale of an image is not associated with the pinch operation, the touch panel device may have a configuration in which the viewpoint changing mode is not provided.

In the above embodiment, the nautical chart is given as an example of map data; however, the object to be rotated is not limited to the nautical chart. For example, the touch panel device may be installed in an automobile, an aircraft and the like, and may have a configuration in which a map can be displayed. Moreover, as a touch panel device, it is not necessarily installed in a movable body, and for example, it may be a tablet PC, a smart phone, a handheld terminal, etc. Moreover, the map data may be two-dimensional/three-dimensional data.

DESCRIPTION OF REFERENCE NUMERAL(S)

| | |
|---|---|
| 1 | Ship Instrument Network System |
| 10 | Ship Network |
| 11 | Touch Panel Device (Device having Touch Panel) |
| 12 | GPS Antenna (GNSS Sensor) |
| 13 | Radar Antenna |
| 14 | Fish Finder |
| 15 | Heading Sensor |
| 16 | Autopilot Device |

-continued

| 21 | Display Unit |
| 22 | User Interface |
| 23 | Memory |
| 24 | Detector |
| 25 | Controller |

What is claimed is:

1. A device having a touch panel that is touched by an operator, comprising:
 a display unit configured to display map data on a display screen;
 a detector configured to detect a first touch operation from the operator on the touch panel on the display screen and a second touch operation from the operator on the touch panel on the display screen, the first touch operation being a touch operation of which a position is fixed, the second touch operation being a touch operation of which a position is changed; and
 a controller configured to:
  obtain the position of the first touch operation where an altitude above a sea surface on the map data is 0 m;
  obtain a first rotational axis perpendicular to the sea surface that intersects the position of the first touch operation;
  obtain a second rotational axis parallel to the sea surface that intersects the position of the first touch operation; and
  simultaneously rotate a viewpoint of the map data centering on the second rotational axis based on a change amount of a distance from the position of the first touch operation to the position of the second touch operation, and rotate the viewpoint centering on the first rotational axis.

2. The device having the touch panel of claim 1, wherein the controller rotates the viewpoint centering on the first rotational axis based on a rotate amount of the second touch operation with respect to the position of the first touch operation.

3. The device having the touch panel of claim 2, wherein the controller is configured to recognize the change amount of the distance and the rotate amount individually.

4. The device having the touch panel of claim 1, wherein among a plurality of touch operations, the touch operation detected first by the detector is the first touch operation.

5. The device having the touch panel of claim 1, wherein a viewpoint changing mode in which the viewpoint is changed is provided, and
 wherein the controller changes the viewpoint only in the viewpoint changing mode.

6. The device having the touch panel of claim 1, wherein when a position of the viewpoint approaches to the sea surface more than a predetermined amount, a display mode is shifted to an underwater display mode in which a situation under the sea is displayed.

7. The device having the touch panel of claim 1, wherein the map data is two-dimensional map data.

8. The device having the touch panel of claim 1, wherein the map data is three-dimensional map data.

9. The device having the touch panel of claim 8, wherein the device is to be installed in a ship,
 wherein the device comprises a memory configured to store nautical chart information as the map data, and
 wherein the controller displays a position of the ship on a nautical chart based on positional information received from a GNSS sensor.

10. A radar apparatus, comprising the device having the touch panel of claim 9.

11. A plotter apparatus, comprising the device having the touch panel of claim 9.

12. A ship network system, comprising the device having the touch panel of claim 9.

13. A viewpoint changing method, comprising:
 displaying map data on a display screen;
 detecting a first touch operation from an operator on a touch panel on the display screen and a second touch operation from the operator on the touch panel on the display screen, the first touch operation being a touch operation of which a position is fixed, the second touch operation being a touch operation of which a position is changed;
 obtaining the position of the first touch operation where an altitude above a sea surface on the map data is 0 m;
 obtaining a first rotational axis perpendicular to the sea surface that intersects the position of the first touch operation;
 obtaining a rotational axis parallel to the sea surface that intersects the position of the first touch operation; and
 simultaneously rotating a viewpoint of the map data centering on the second rotational axis based on a change amount of a distance from the position of the first touch operation to the position of the second touch operation, and rotating the viewpoint centering on the first rotational axis.

14. A device having a touch panel that is touched by an operator, comprising:
 a display unit configured to display map data on a display screen;
 a detector configured to detect a first touch operation from the operator on the touch panel and a second touch operation from the operator on the touch panel on the display screen; and
 a controller configured to:
  obtain a position of the first touch operation where an altitude above a sea surface on the map data is 0 m;
  obtain a first rotational axis perpendicular to the sea surface that intersects the position of the first touch operation;
  obtain a second rotational axis parallel to the sea surface that intersects the position of the first touch operation; and
  simultaneously rotate a viewpoint of the map data centering on the first rotational axis based on a rotate amount of the second touch operation with respect to the position of the first touch operation, and rotate the viewpoint centering on the second rotational axis based on a change amount of a distance from the position of the first touch operation to a position of the second touch operation.

* * * * *